(12) United States Patent
Shintre et al.

(10) Patent No.: US 11,816,241 B1
(45) Date of Patent: Nov. 14, 2023

(54) SYSTEMS AND METHODS FOR PROTECTING USER PRIVACY

(71) Applicant: GEN DIGITAL INC., Tempe, AZ (US)

(72) Inventors: Saurabh Shintre, Sunnyvale, CA (US); Daniel Marino, Los Angeles, CA (US)

(73) Assignee: GEN DIGITAL INC., Tempe, AZ (US)

( * ) Notice: Subject to any disclaimer, the term of this patent is extended or adjusted under 35 U.S.C. 154(b) by 65 days.

(21) Appl. No.: 17/172,843

(22) Filed: Feb. 10, 2021

(51) Int. Cl.
  *G06F 21/62* (2013.01)
  *G06T 5/00* (2006.01)

(52) U.S. Cl.
  CPC ...... *G06F 21/6245* (2013.01); *G06F 21/6209* (2013.01); *G06T 5/004* (2013.01); *G06T 2207/20172* (2013.01)

(58) Field of Classification Search
  None
  See application file for complete search history.

(56) References Cited

U.S. PATENT DOCUMENTS

| | | | | |
|---|---|---|---|---|
| 2015/0067878 A1* | 3/2015 | Steelberg | ........... | G06F 21/10 |
| | | | | 726/26 |
| 2015/0221345 A1* | 8/2015 | Zhao | ........... | G11B 27/102 |
| | | | | 386/241 |
| 2015/0371613 A1* | 12/2015 | Patel | ........... | G09G 5/395 |
| | | | | 345/549 |
| 2016/0224766 A1* | 8/2016 | Steelberg | ........... | G06F 21/10 |
| 2017/0278546 A1* | 9/2017 | Xiao | ........... | G06T 5/00 |

OTHER PUBLICATIONS

L. Yuan, P. Korshunov and T. Ebrahimi, "Privacy-preserving photo sharing based on a secure JPEG," 2015 IEEE Conference on Computer Communications Workshops (INFOCOM Wkshps), 2015, pp. 185-190, doi: 10.1109/INFCOMW.2015.7179382. (Year: 2015).*

* cited by examiner

*Primary Examiner* — Alexander Lagor
*Assistant Examiner* — Felicia Farrow
(74) *Attorney, Agent, or Firm* — Greenberg Traurig, LLP

(57) ABSTRACT

The disclosed computer-implemented method for protecting user privacy may include (i) receiving an indication to protect a photo with privacy-protecting blurring, (ii) generating a blurred version of the photo, (iii) generating, based on the blurred version of the photo, a video that progressively de-blurs the photo, (iv) linking through metadata the blurred version of the photo and the video that progressively de-blurs the photo as a combined motion-photo-object, and (v) storing the combined motion-photo-object in a configured location such that a photo display program uses the blurred version of the photo as a preview of the motion-photo-object when browsing but plays the video that progressively de-blurs the photo in response to additional user input selecting the preview. Various other methods, systems, and computer-readable media are also disclosed.

20 Claims, 12 Drawing Sheets

SYSTEMS AND METHODS FOR PROTECTING USER PRIVACY

BACKGROUND

In the modern smartphone and tablet marketplace, users frequently capture photos with the cameras on their devices. Later, these users may desire to share their devices with others to show one or more of these photos. Or the users may desire to view the photos in a public space where another individual might intentionally or accidentally view the photos. Although some photos may be benign or harmless when revealed to others, other photos in the same gallery may be sensitive or private for any one of a multitude of different reasons. Accordingly, it may be beneficial to help the user protect the privacy of these photos. The present disclosure, therefore, identifies and addresses a need for improved systems and methods for protecting user privacy.

SUMMARY

As will be described in greater detail below, the present disclosure describes various systems and methods for protecting user privacy. In one example, a computer-implemented method for protecting user privacy may include (i) receiving an indication to protect a photo with privacy-protecting blurring, (ii) generating a blurred version of the photo, (iii) generating, based on the blurred version of the photo, a video that progressively de-blurs the photo, (iv) linking through metadata the blurred version of the photo and the video that progressively de-blurs the photo as a combined motion-photo-object, and (v) storing the combined motion-photo-object in a configured location such that a photo display program uses the blurred version of the photo as a preview of the motion-photo-object when browsing but plays the video that progressively de-blurs the photo in response to additional user input selecting the preview.

In one embodiment, the combined motion-photo-object may include a combination file that stores the photo and the video together as two separate files included within the combination file. In one embodiment, the combined motion-photo-object embeds the photo within extra space in a video file storing the file or embeds the video within extra space in a photo file storing the photo. In one embodiment, the motion-photo-object is formatted in an operating system or smartphone manufacturer format. In one embodiment, the format may include APPLE LIVE PHOTOS, SAMSUNG MOTION PHOTOS, GOOGLE MOTION PHOTOS, or MICROSOFT LIVING IMAGES.

In one embodiment, the combined motion-photo-object repurposes a file format that was designed to add contextual motion animation to single photo frames for the different purpose of protecting user privacy. In one embodiment, the combined motion-photo-object supplements the photo with a set of blurred versions of the photo that were generated by software after capturing the photo rather than only supplementing the photo with additional photos captured before or after capturing the photo.

In one embodiment, the video may include just two frames that include the photo and the blurred version of the photo. In one embodiment, the photo may include sensitive content that benefits from privacy protection through blurring.

In some examples, receiving an indication to protect a photo with privacy-protecting blurring may include receiving an indication that a user toggled a graphical user interface button to blur the photo by creating the combined motion-photo-object. In some examples, generating the video that progressively de-blurs the photo may include receiving a selection of a graphical user interface button of a level of blurring to be applied to the photo. In some examples, the computer-implemented method may further include displaying a circular or rotating icon that indicates software processing while generating the video. In one embodiment, the computer-implemented method may further include displaying, in response to completing the combined motion-photo-object, a prompt indicating that the combined motion-photo-object was added to a photo library. In one embodiment, the combined motion-photo-object is stored outside of an encrypted vault due to the blurring of the photo protecting user privacy rather than an encryption scheme of the encrypted vault.

In one embodiment, a system for implementing the above-described method may include (i) a reception module, stored in memory, that receives an indication to protect a photo with privacy-protecting blurring, (ii) a generation module, stored in memory, that generates a blurred version of the photo, (iii) where the generation module generates, based on the blurred version of the photo, a video that progressively de-blurs the photo, (iv) a linking module, stored in memory, that links through metadata the blurred version of the photo and the video that progressively de-blurs the photo as a combined motion-photo-object, (v) a storing module, stored in memory, that stores the combined motion-photo-object in a configured location such that a photo display program uses the blurred version of the photo as a preview of the motion-photo-object when browsing but plays the video that progressively de-blurs the photo in response to additional user input selecting the preview, and (vi) at least one physical processor configured to execute the reception module, the generation module, the linking module, and the storing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive an indication to protect a photo with privacy-protecting blurring, (ii) generate a blurred version of the photo, (iii) generate, based on the blurred version of the photo, a video that progressively de-blurs the photo, (iv) link through metadata the blurred version of the photo and the video that progressively de-blurs the photo as a combined motion-photo-object, and (v) store the combined motion-photo-object in a configured location such that a photo display program uses the blurred version of the photo as a preview of the motion-photo-object when browsing but plays the video that progressively de-blurs the photo in response to additional user input selecting the preview.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
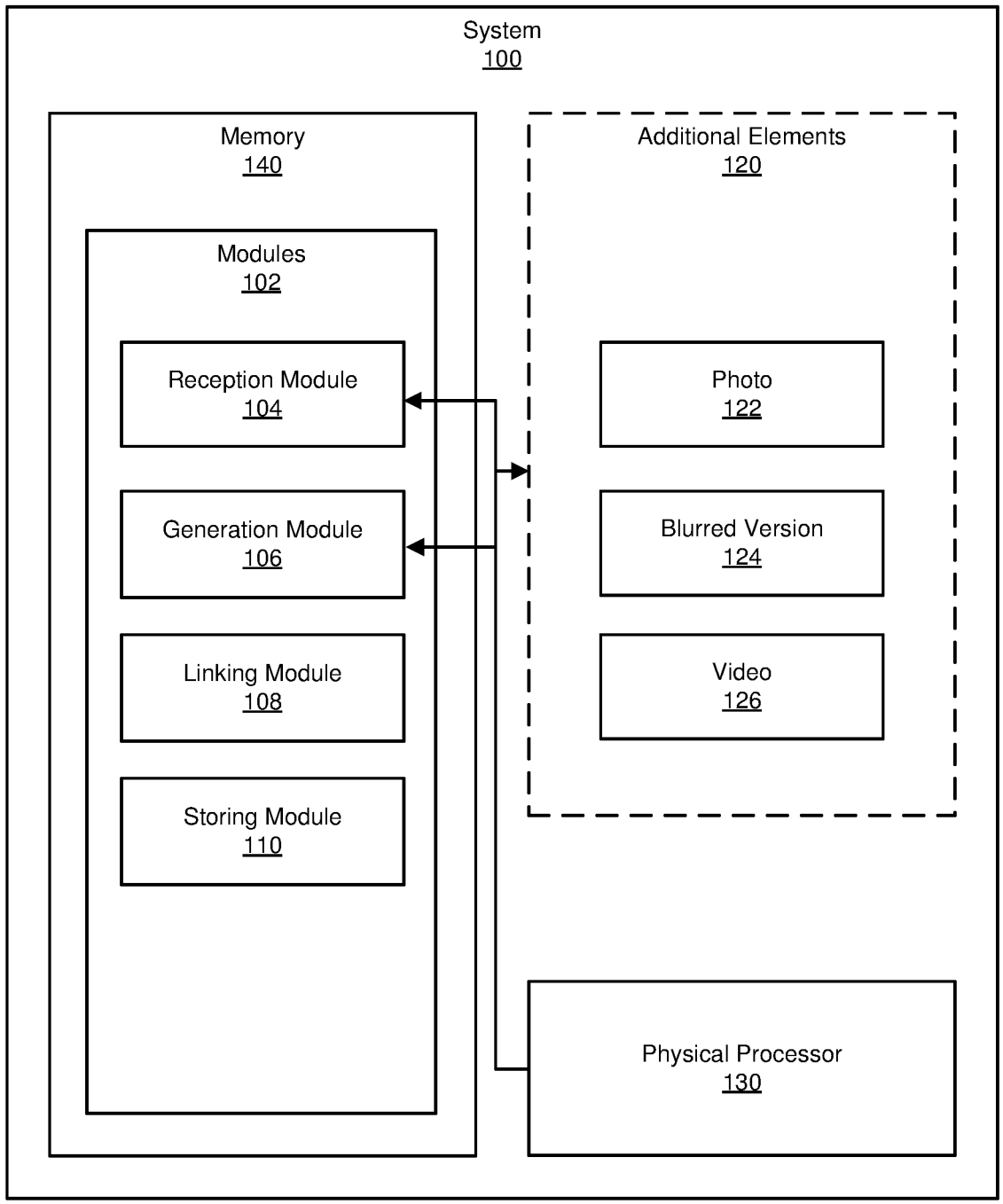
FIG. 1 is a block diagram of an example system for protecting user privacy.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting user privacy. Modern smartphones may contain many sensitive pictures. These pictures may be visible to unauthorized parties when the photos are browsed through the photo gallery in a public location such as an airport. The pictures may also be visible to unauthorized parties when an individual smartphone owner hands over physical access to the phone to a trustable but potentially curious party, such as a relative. Generally speaking, photo gallery applications do not provide an easy way to hide a sensitive picture within themselves. Applications that provide a separate vault-like service for pictures increase the burden of use for pictures that are not highly sensitive. The absence of a usable privacy mechanism here often leaves such pictures exposed to unauthorized parties.

Some related systems may blur images, yet the systems may provide no mechanism for deblurring the photos directly through the same photo gallery application where the user is browsing. Some organizations may provide a method to hide a certain image in a gallery application where the image is no longer visible in the regular library and is moved to a hidden album. Hidden photos may only be viewed when interacting with the hidden album, thereby creating another inconvenience for the user. Additionally, certain private vault applications may move user-selected images to a separate file vault. Nevertheless, images in the vaults can only be interacted with through the vault. The subject matter disclosed herein may help to address these problems by providing a new, inventive, and more user-friendly privacy protection mechanism that is based on blurring sensitive photos, as discussed further below.

Figure 2:
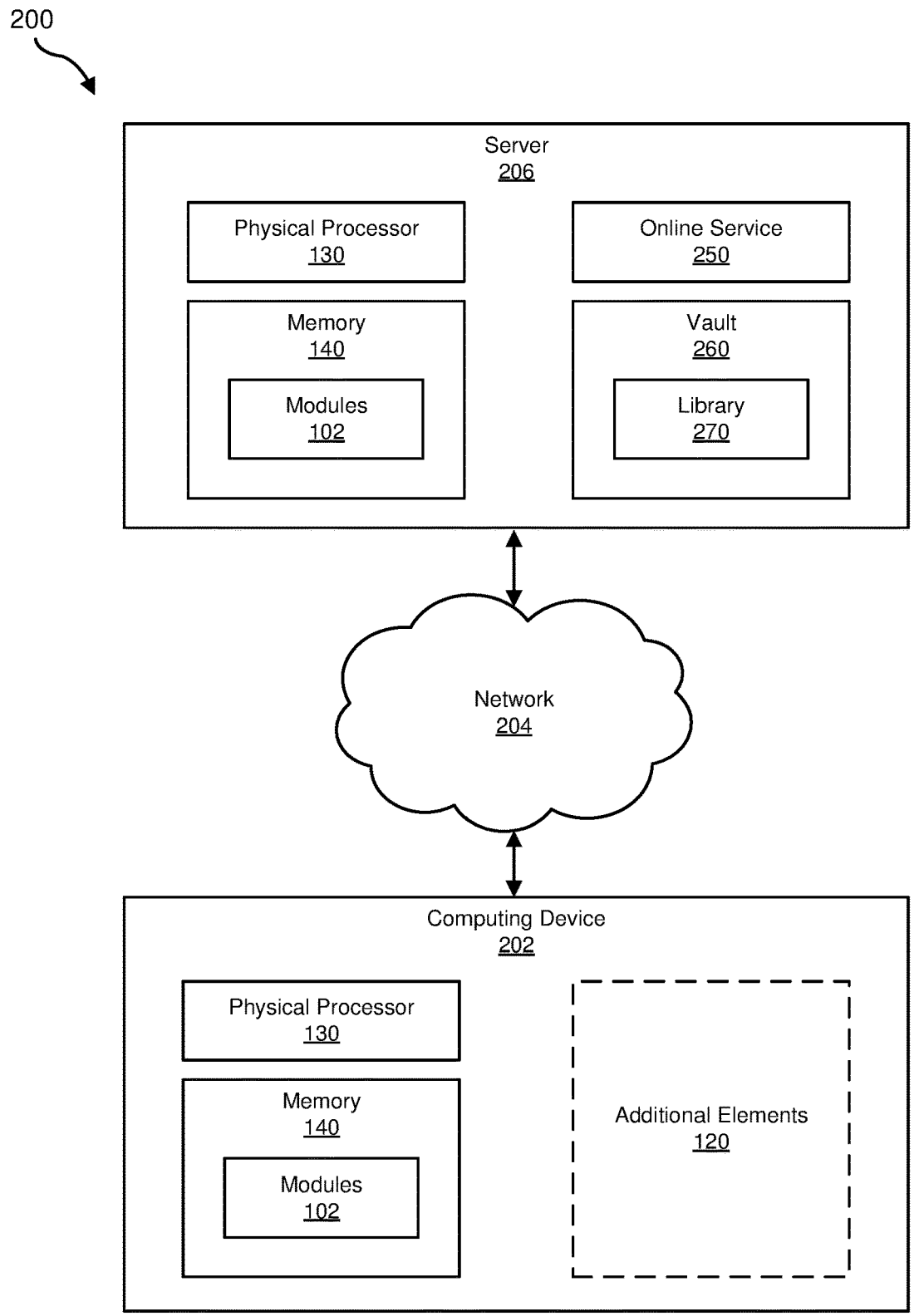
FIG. 2 is a block diagram of an additional example system for protecting user privacy.

The following will provide, with reference to FIGS. 1-2, detailed descriptions of example systems for protecting user privacy. Detailed descriptions of corresponding computer-implemented methods will also be provided in connection with FIGS. 3-9. In addition, detailed descriptions of an example computing system and network architecture capable of implementing one or more of the embodiments described herein will be provided in connection with FIGS. 11 and 12, respectively.

FIG. 1 is a block diagram of example system 100 for protecting user privacy. As illustrated in this figure, example system 100 may include one or more modules 102 for performing one or more tasks and additional elements, such as photo 122, blurred version 124 of photo 122, and video 126 that progressively de-blurs photo 122. For example, and as will be explained in greater detail below, example system 100 may include a reception module 104 that receives an indication to protect photo 122 with privacy-protecting blurring. Example system 100 may additionally include a generation module 106 that generates blurred version 124 of photo 122. Generation module 106 may also generate video 126 that progressively de-blurs photo 122. Example system 100 may also include a linking module 108 that links through metadata the blurred version 124 and video 126 as a combined motion-photo-object. Example system 100 may additionally include a storing module 110 that stores the combined motion-photo-object in a configured location such that a photo display program uses blurred version 124 of photo 122 as a preview of the motion-photo-object when browsing but plays video 126 that progressively de-blurs photo 122 in response to additional user input selecting the preview. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting user privacy. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect user privacy. For example, and as will be described in greater detail below, one or more of modules 102 may cause computing device 202 and/or server 206 to protecting user privacy.

FIG. 2 shows how computing device 202, which may include modules 102, may operate in connection with a server 206. Server 206 may provide an online service 250, such as a cybersecurity service or an online photo library service. Online service 250 may store a library 270 of photos from users within a vault 260. Alternatively, in other examples, modules 102 may operate entirely client-side.

Computing device 202 generally represents any type or form of computing device capable of reading computer-executable instructions. In some embodiments, competing device 202 may correspond to a smartphone or a tablet, as shown further in FIGS. 4-9. Additional examples of computing device 202 include, without limitation, laptops, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300 in accordance with FIG. 2. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
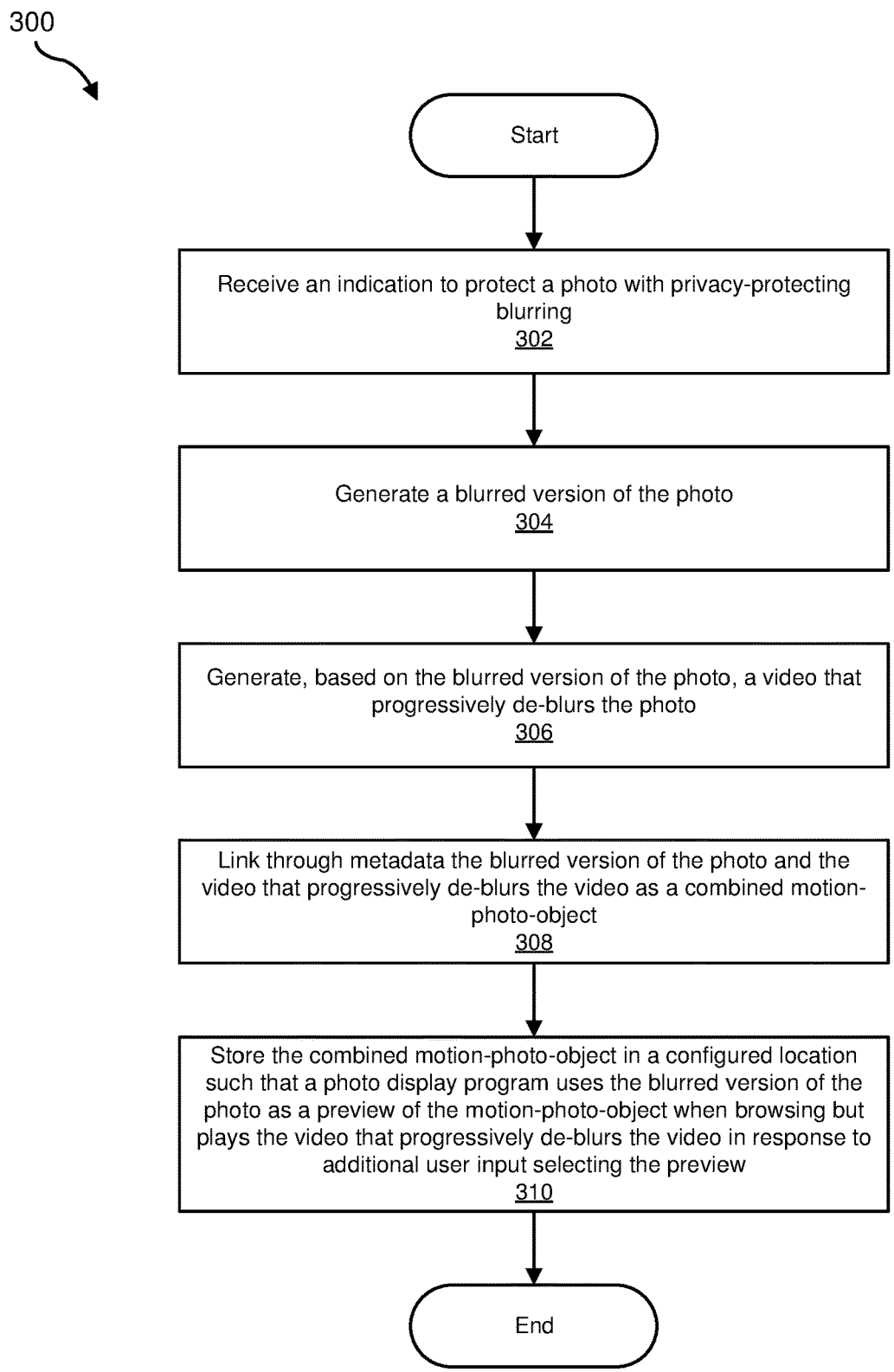
FIG. 3 is a flow diagram of an example method for protecting user privacy.

FIG. 3 is a flow diagram of an example computer-implemented method 300 for protecting user privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive an indication to protect a photo with privacy-protecting blurring. For example, reception module 104 may, as part of computing device 202 in FIG. 2, receive an indication to protect photo 122 with privacy-protecting blurring.

Figure 4:
FIGS. 4-10 show a series of graphical user interfaces that illustrate an example of the method for protecting user privacy.

Reception module 104 may perform step 302 in a variety of ways. In some examples, reception module 104 may receive an indication to protect a photo with privacy-protecting blurring by receiving an indication that a user toggled a graphical user interface button to blur the photo. FIG. 4 shows an example graphical user interface that may correspond to the performance of step 302. The graphical user interface may correspond to an interface for a privacy or cybersecurity application, as discussed further below.

As further shown in this figure, the graphical user interface may include a button 402, which enables a user to go back, a button 404, which enables a user to create a "PhotoBlur" (which corresponds to the combined motion-photo-object of method 300), and a button 406, which enables a user to add a photo to a local vault rather than the remote vault 260 of FIG. 2. The graphical user interface of this figure may correspond to a privacy or cybersecurity application. Such an application may scan and detect sensitive photos that are present on a user's device. The application may use artificial intelligence or machine learning to detect the presence of sensitive photos or other media content. In some examples, the application may enable the user to browse through photos categorized as "identity," "work," or "personal." The application may preview or share identified images. The application may also ensure secure access to the application using a device locking mechanism, such as a PIN, password, TouchID, or FaceID. One illustrative example of such a cybersecurity application may correspond to NORTONLABS XPOSURE.

Thus, in the example of FIG. 4, the cybersecurity application may have scanned for, and detected, the photograph of the passport information that is shown. The cybersecurity application may subsequently present the identified photograph to the user, perhaps with a tag or categorization of "identity," as discussed above.

In one embodiment, the photo may include sensitive content that benefits from privacy protection through blurring. For example, FIG. 4 further illustrates how the photo may include sensitive content, such as passport information. In other examples, the photo may include private, embarrassing, or adult-themed material. The photo may be sensitive and protected for privacy purposes for any one of a variety of reasons, including reasons that are idiosyncratic to the specific user handling the smartphone.

At step 304, one or more of the systems described herein may generate a blurred version of the photo. For example, generation module 106 may, as part of computing device 202 in FIG. 2, generate blurred version 124 of photo 122.

Generation module 106 may perform step 304 in a variety of ways. As used herein, the phrase "blur" generally refers broadly to significantly or substantially distorting the information content of the photo to thereby reduce the amount of information revealed. In more specific embodiments, amendments may clarify that the specific type of blurring performed corresponds to making the photograph more indistinct, hazy an outline or appearance, obscure, dim, unclear, and/or cloudy.

At step 306, one or more of the systems described herein may generate, based on the blurred version of the photo, a video that progressively de-blurs the photo. For example, generation module 106 may, as part of computing device 202 in FIG. 2, generate, based on blurred version 124 of photo 122, video 126 that progressively de-blurs photo 122.

Generation module 106 may perform step 306 in a variety of ways. For example, generation module 106 may generate a video that has just two frames. These two frames may include the photo and the blurred version of the photo. Thus, when the user toggles the video in accordance with step 310, the image may snap between the blurred version of the photo and the original photo, without a slower and more granular progression. In other examples, generation module 106 may generate a video with more than two frames. For example, generation module 106 may generate a video that has exactly or about 10 frames. In such examples, the level of blurring between frames may be substantially uniform and continuous to create a smooth de-blurring effect. In other examples, the level of blurring between frames may be nonuniform or nonlinear. In further examples, generation module 106 may generate a video with any number of frames larger than 10, including numbers that are substantially larger than 10. Any number of frames may be suitable so long as the resulting video performs the privacy protecting functions of method 300.

Figure 5:
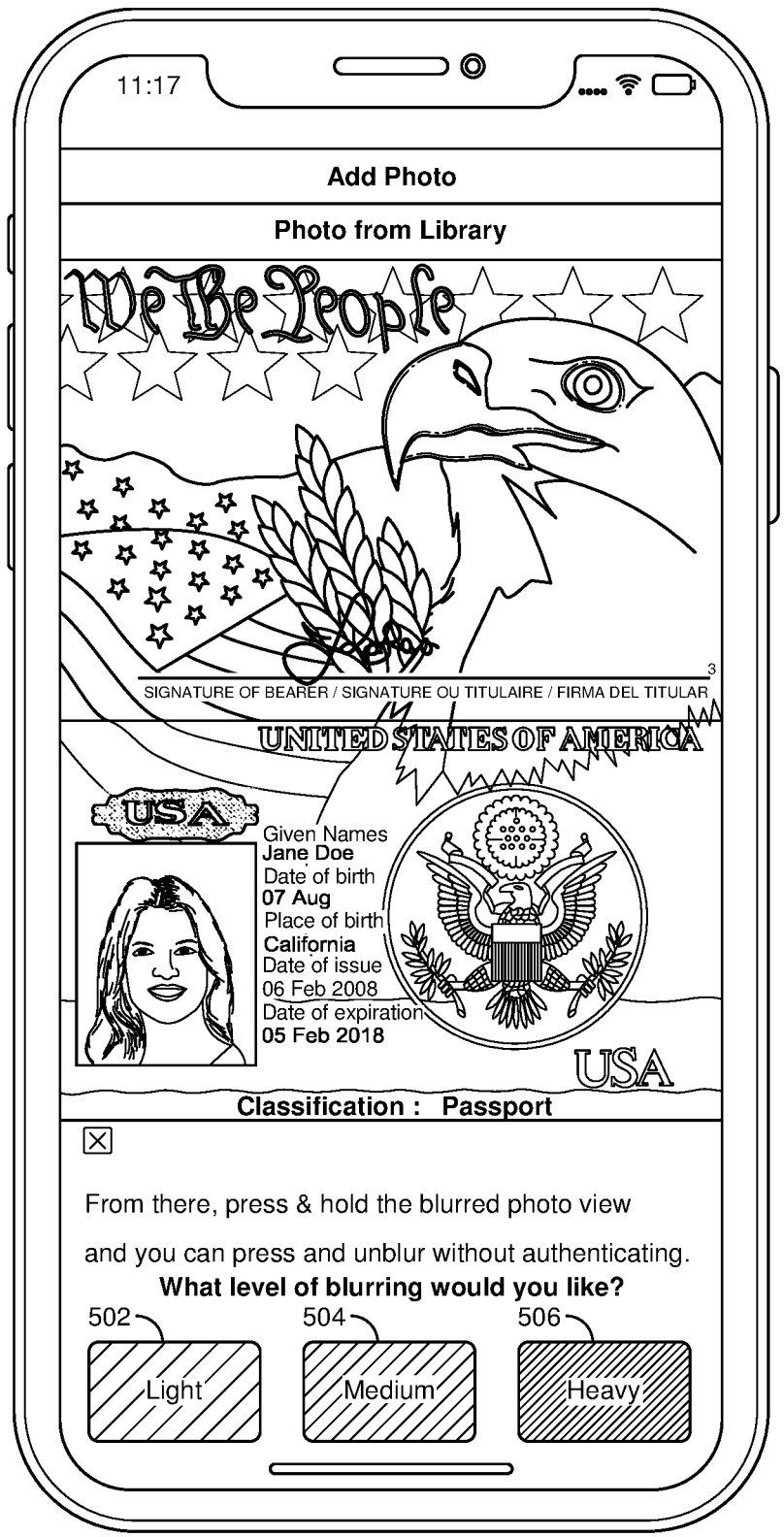

In some examples, generation module 106 may generate the video that progressively de-blurs the photo by receiving a selection of a graphical user interface button of a level of blurring to be applied to the photo. FIG. 5 shows that the graphical user interface for the cybersecurity application may include a button 502, which specifies a light level of blurring, button 504, which specifies a medium level of blurring, and a button 506, which specifies a heavy level blurring. In some examples, the user pressing one of these level-of-blurring buttons may constitute the final button press necessary to trigger the creation of the video file. In other examples, the user may be requested to provide additional input to confirm the request to generate the file after previously pressing the button to select the level of blurring.

Figure 6:
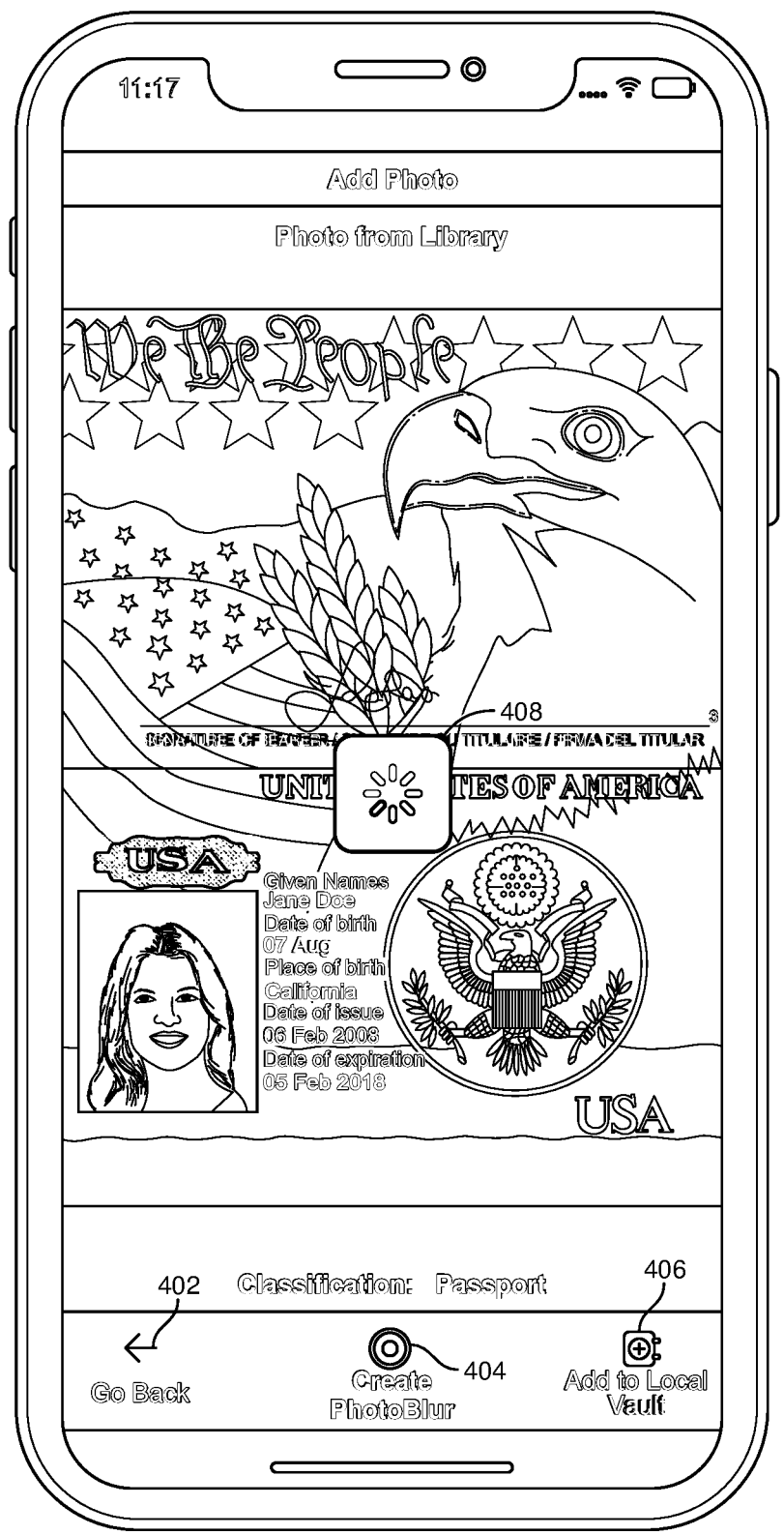

In some examples, generation module 106 may display a circular or rotating icon that indicates software processing while generating the video. FIG. 6 shows an example of the graphical user interface for the cybersecurity application where a circular or rotating icon 408 indicates to the user that the cybersecurity application is performing processing to generate the blurred version of the photograph and the corresponding video.

At step 308, one or more of the systems described herein may link through metadata the blurred version of the photo and the video that progressively de-blurs the photo as a combined motion-photo-object. For example, linking module 108 may, as part of computing device 202 in FIG. 2, link through metadata blurred version 124 of photo 122 and video 126 that progressively de-blurs photo 122 as a combined motion-photo-object.

Linking module 108 may perform step 308 in a variety of ways. In one embodiment, the combined motion-photo-object may include a combination file that stores the photo and the video together as two separate files included within the combination file. By analogy, a compressed ZIP file may have its own file format and file extension, while also embedding within itself multiple other distinct files. Alternatively, in one embodiment, the combined motion-photo-object embeds the photo within extra space in a video file storing the file or embeds the video within extra space in a photo file storing the photo. For example, linking module 108 may embed the video at the end of a JPEG or other image file in a configuration such that conventional and general-purpose image viewing applications may ignore the video content at the end of the file, even if another application may be enhanced with intelligence to recognize the video content at the end of the file and extract it appropriately. Alternatively, in other examples, the image file may be embedded within extra or dead space within a movie file stored within a conventional or general-purpose video file format. Moreover, although the example above focused on embedding one of the files within space at the end of the other file, the extra space that is conventionally ignored may be found within any portion or field within the other file.

In one embodiment, the motion-photo-object is formatted in an operating system or smartphone manufacturer format. The format may include APPLE LIVE PHOTOS, SAMSUNG MOTION PHOTOS, GOOGLE MOTION PHOTOS, or MICROSOFT LIVING IMAGES. In some examples, the image and video content may have been captured using the HIGH EFFICIENCY IMAGE FILE FORMAT (HEIF/HEIC) and/or HIGH-EFFICIENCY VIDEO FILE FORMAT (HEVF/HEVC) codecs. Such file formats are similar to conventional animated GIF files, however conventional animated GIF files generally do not prioritize or privilege one specific image file over the others. Nor do such conventional animated GIF files generally link one separately identified image with a distinct set of image frames forming a video. In contrast, the file formats listed above, such as APPLE LIVE PHOTOS, may tie or link a captured photograph to one or more videos that correspond to video content that was captured prior to the capturing of the main photograph or after the capturing of the main photograph. In other words, the sensor of the camera on a modern smartphone may be continuously capturing and storing content within a memory cache such that, when the user triggers the shutter to capture a specific photograph, a corresponding application may retrieve video content that was previously captured prior to the specific photograph, and/or may retrieve video content that was subsequently captured after the specific photograph. The native camera applications for various smartphone manufacturers may use the file formats listed above to link the specific photograph that was captured with the one or more items of video content captured before or after the specific photograph.

In one embodiment, the combined motion-photo-object repurposes a file format that was designed to add contextual motion animation to single photo frames for the different purpose of protecting user privacy. Thus, the cybersecurity application of FIGS. 4-6 may repurpose one or more of the file formats listed above, such as APPLE LIVE PHOTOS, for the purposes of protecting user privacy through blurring of sensitive content and photographs, which is significantly different than the previous and conventional usage of these file formats. In other words, the combined motion-photo-object may supplement the photo with a set of blurred versions of the photo that were generated by software (e.g., blurred photos) after capturing the photo rather than only supplementing the photo with additional photos captured before or after capturing the photo. Although the example of method 300 focuses on software creating new photos through blurring a previously captured photo, a variation of method 300 may also be used, in alternative examples, to create combined motion-photo-objects that supplement the originally captured photo with other artificially generated-by-software images, which is still distinct from the conventional usage of these file formats, which supplements the original specific file with additional natural and unmodified frames of video before or after the capturing of the original photograph.

Figure 7:
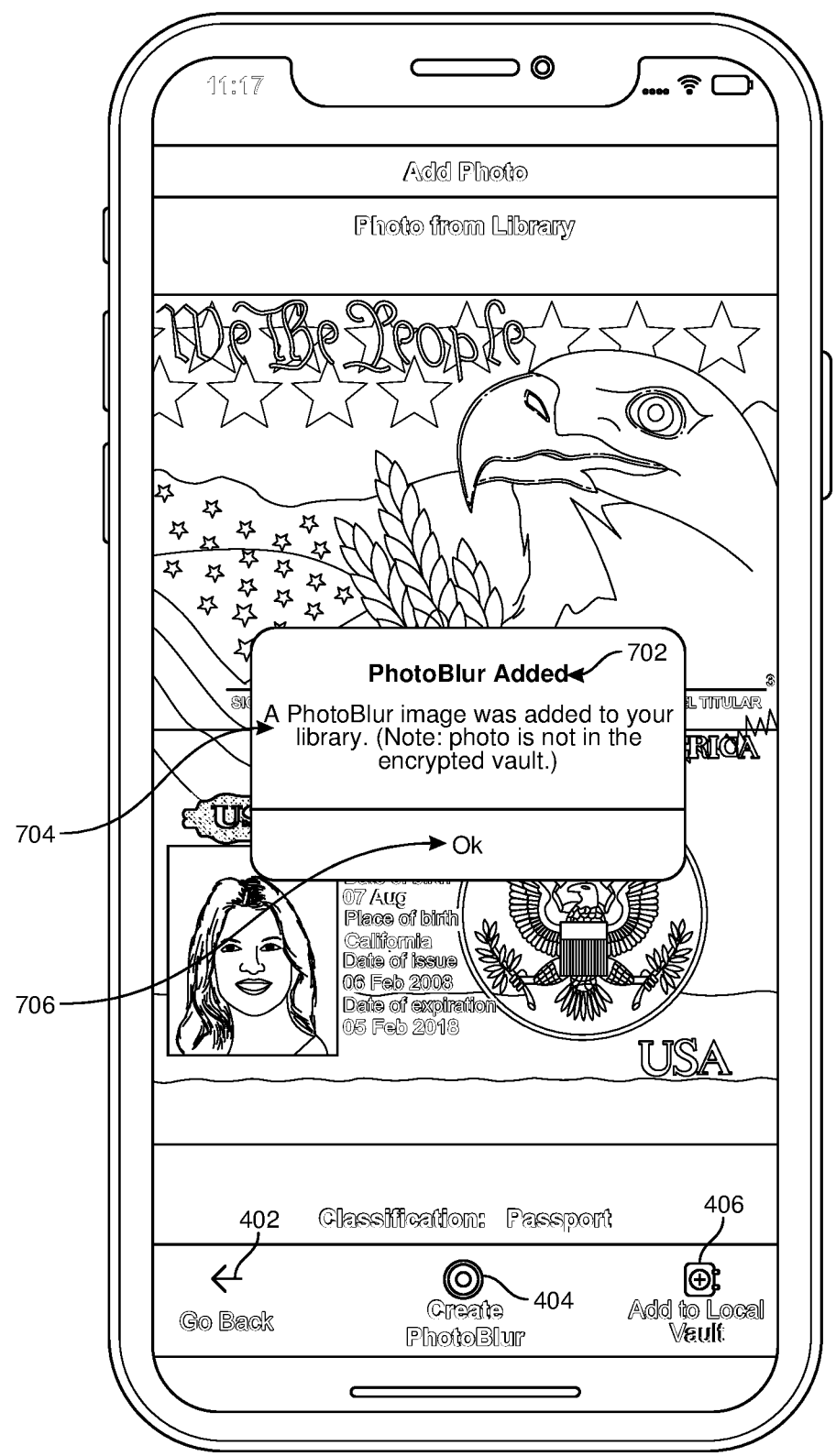

In one embodiment, systems described herein may display, in response to completing the combined motion-photo-object, a prompt indicating that the combined motion-photo-object was added to a photo library. FIG. 7 shows that the graphical user interface for the cybersecurity application may include a prompt that has a header 702, a notification 704, and a button 706. Header 702 and notification 704 may notify the user that the PhotoBlur was created and/or added to a library. Notification 704 may also optionally notify the user that the photo was not stored in an encrypted vault, which creates an obstacle for the user to use (i.e., entering a password). Instead, the photo may have been stored within an unencrypted fault, such as the photo gallery corresponding to the native application on a modern smartphone device. In one embodiment, the combined motion-photo-object is stored outside of an encrypted vault due to the blurring of the photo protecting user privacy rather than an encryption scheme of the encrypted vault. In other words, the user can afford to store the photo outside of the encrypted vault, without a substantial loss of privacy protection, because the blurring of the photograph effectively functions as a substitute that nevertheless protects the privacy of the user, while furthermore avoiding the user interface inefficiencies associated with the encrypted vault (e.g., forcing the user to navigate to a separate photo gallery application and/or enter and complete a cumbersome password procedure).

At step 310, one or more of the systems described herein may store the combined motion-photo-object in a configured location such that a photo display program uses the blurred version of the photo as a preview of the motion-photo-object when browsing but plays the video that progressively de-blurs the photo in response to additional user input selecting the preview. For example, storing module 110 may, as part of computing device 202 in FIG. 2, store the combined motion-photo-object in a configured location such that a photo display program uses blurred version 124 of photo 122 as a preview of the motion-photo-object when browsing but plays video 126 that progressively de-blurs photo 121 in response to additional user input selecting the preview.

Storing module 110 may perform step 310 in a variety of ways. Generally speaking, storing module 110 may store the combined motion-photo-object in a configured location, such as a location configured to provide photos for a native photo or gallery application on a modern smartphone, such that the photo application processes the combined motion-photo-object in a manner that is essentially the same as for conventional LIVE PHOTOS or MOTION PHOTOS formats. As further discussed above, modern smartphone manufacturers and corresponding vendors may provide LIVE PHOTOS and MOTION PHOTOS, etc., that display captured photographs in combination with contextual video content that was captured before and/or after the capturing of the photographs. Importantly, the native photo or gallery applications for the smartphone manufacturers may both generate the LIVE PHOTOS or MOTION PHOTOS, and also display such photos with dynamic display options. In particular, the native photo or gallery applications may display these photos in a dynamic manner such that the native photo or gallery applications initially display a preview or instance of the specific captured photograph. Nevertheless, the native photo or gallery applications may dynamically play the video in response to receiving additional user input, such as the user pressing and holding a finger on the display preview. Thus, according to the conventional usage of these dynamic motion image files, the user may press a finger on a preview of the captured photograph and thereby trigger the animation of video that was captured before and/or after the capturing of the photograph.

The inventive technology of this application may alter the generation stage for generating such dynamic motion image files, as discussed above, while nevertheless optionally leaving the dynamic animation stage unaltered. Accordingly, rather than generating such dynamic motion image files by supplementing a specific captured photograph with supplemental video captured before and/or after the capturing of the photograph, the cybersecurity application of FIGS. 4-6 may instead generate the combined motion-photo-object in accordance with method 300 to link the blurred version of the photograph with the video that progressively de-blurs the photograph, as discussed above. In some example, generation module 106 may generate the combined motion-photo-object such that the combined motion-photo-object strictly follows the formatting for conventional dynamic motion image file formats, such as LIVE PHOTOS and MOTION PHOTOS, as discussed above. Accordingly, the difference between a conventional dynamic motion photo and the new privacy-protecting PhotoBlur of method 300 may be imperceptible to the dynamic animation stage of the native photo or gallery applications. In other words, by placing the combined motion-photo-object in a configured location where the native photo or gallery application expects dynamic motion image files that it previously generated according to the conventional methodology described above, method 300 may thereby trigger the photo or gallery application to display the new privacy-protecting PhotoBlur in exactly the same manner. Because the native photo or gallery application does not check the frames of such files to verify whether they were generated according to the conventional methodology or, instead, according to the new inventive and privacy-protecting methodology of method 300, such photo or gallery applications may display and animate both types of files in exactly the same manner, without detecting or perceiving any difference. Thus, whereas the user may previously have held down a finger on a preview of a photograph to trigger the animation of video content that was captured before or after the photograph, according to method 300 the user may hold down a finger on a blurred version of the photograph, in exactly the same manner, to trigger a video that progressively de-blurs the photograph, as further discussed above.

Figure 8:
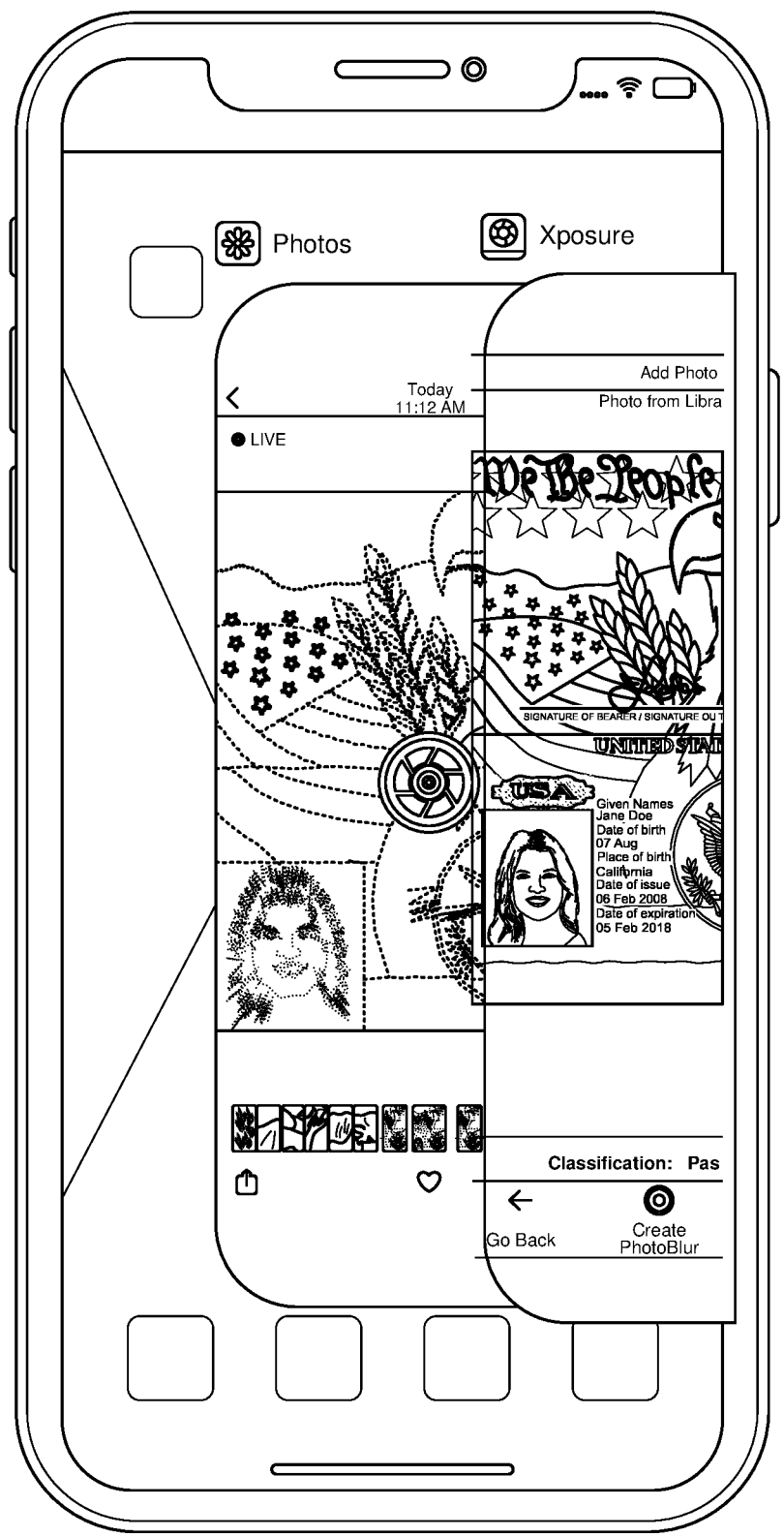
Figure 9:
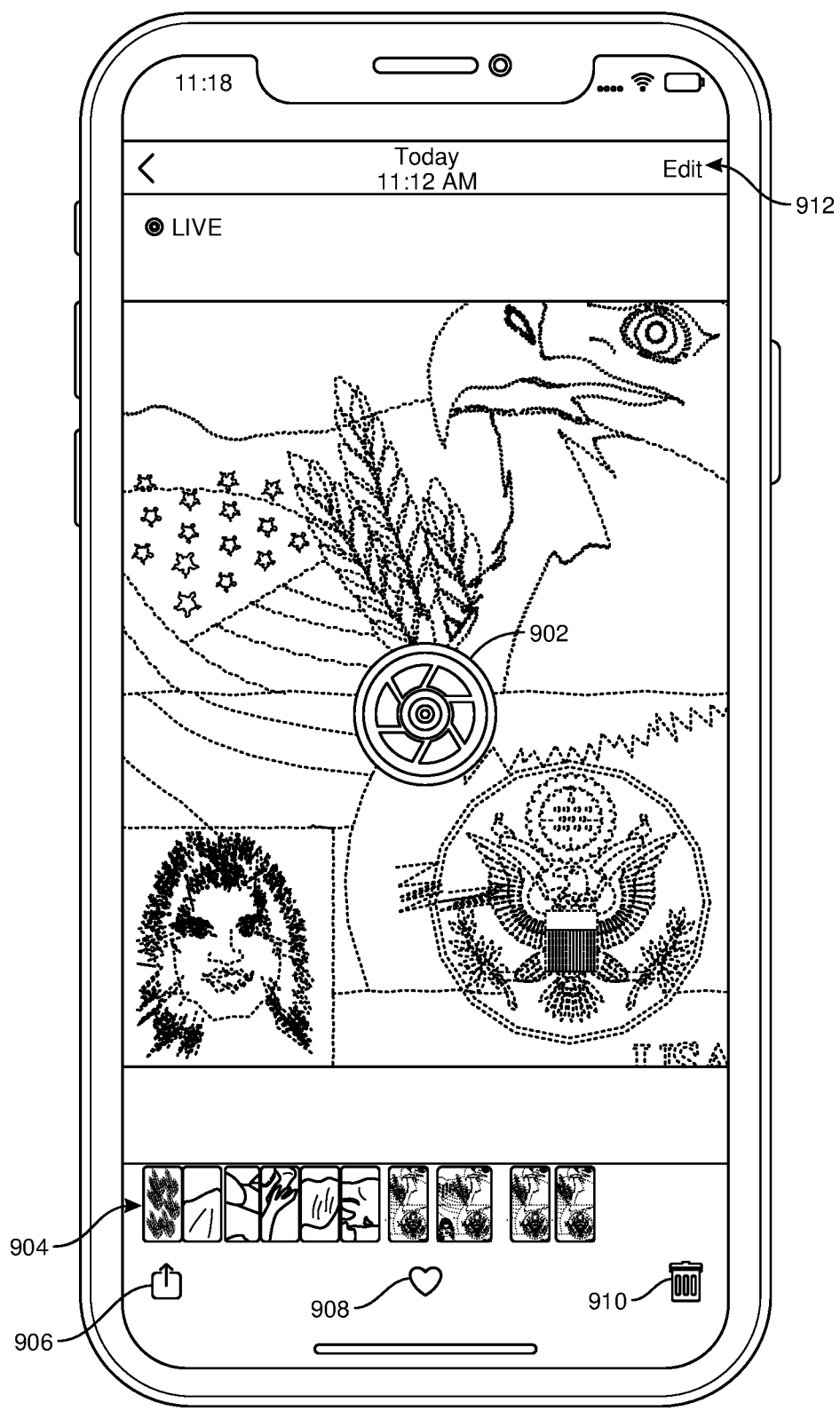
Figure 10:
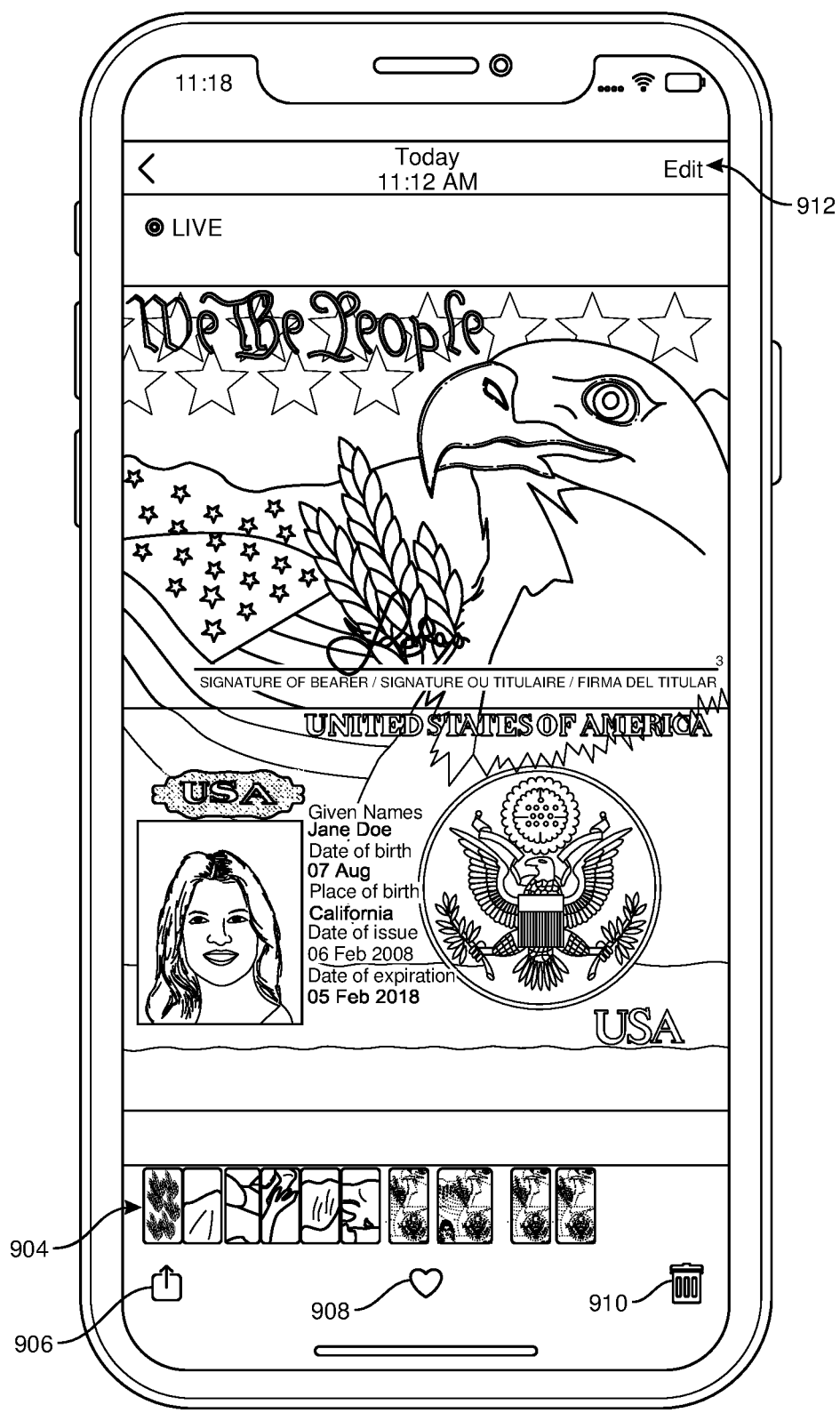

For purposes of illustration, FIG. 8 shows how the user may zoom out from the cybersecurity application (i.e., "Xposure" in FIG. 8) and then navigate to the touchscreen to access the native photo or gallery application on the smartphone device (i.e, "Photos" in FIG. 8). FIG. 9 further shows that the user may have successfully navigated into the native application, which may be provided by the smartphone manufacturer by default, and which may function substantially as a general purpose image viewer without a corresponding substantial focus on user privacy or cybersecurity. Notably, both the respective owners/creators (e.g., APPLE and NORTONLIFELOCK) and the respective two applications (e.g. PHOTOS and Xposure) may be logically, legally, and/or functionally separate, independent, and/or distinct, such that the cybersecurity application may provide privacy-protection benefits, in accordance with method 300, that effectively supplement and improve the functionality of the native photo or gallery application. Returning to FIG. 9, the graphical user interface of the native photo application may include an edit button 912, a toggle button 902, which the user may toggle to trigger the animation of the de-blurring of the photograph, a series of previews 904, an upload or share button 906, a like or heart button 908, and a trash button 910. In addition to toggle button 902, the graphical user interface may also optionally insert an element, such as a textual prompt or identifier, that indicates to the user that the blurred preview corresponds to a protected live PhotoBlur. As used herein, the term "preview" generally refers to any smaller or same size instance of a photograph, or substantially similar version of the photograph, that effectively functions as a preview prior to the animation of the video in accordance with method 300. Thus, the term "preview" may generally refer the photograph underneath toggle button 902, but may also refer to any one of the smaller previews in series of previews 904. FIG. 9 illustrates how the user may hold a finger substantially over or near toggle button 902 to thereby trigger the animation of the de-blurring of the photograph. In response, FIG. 10 illustrates how the native photo or gallery application may respond by animating the de-blurring of the photograph, resulting in the final display of the completely de-blurred version of the photograph as shown in this figure.

Figure 11:
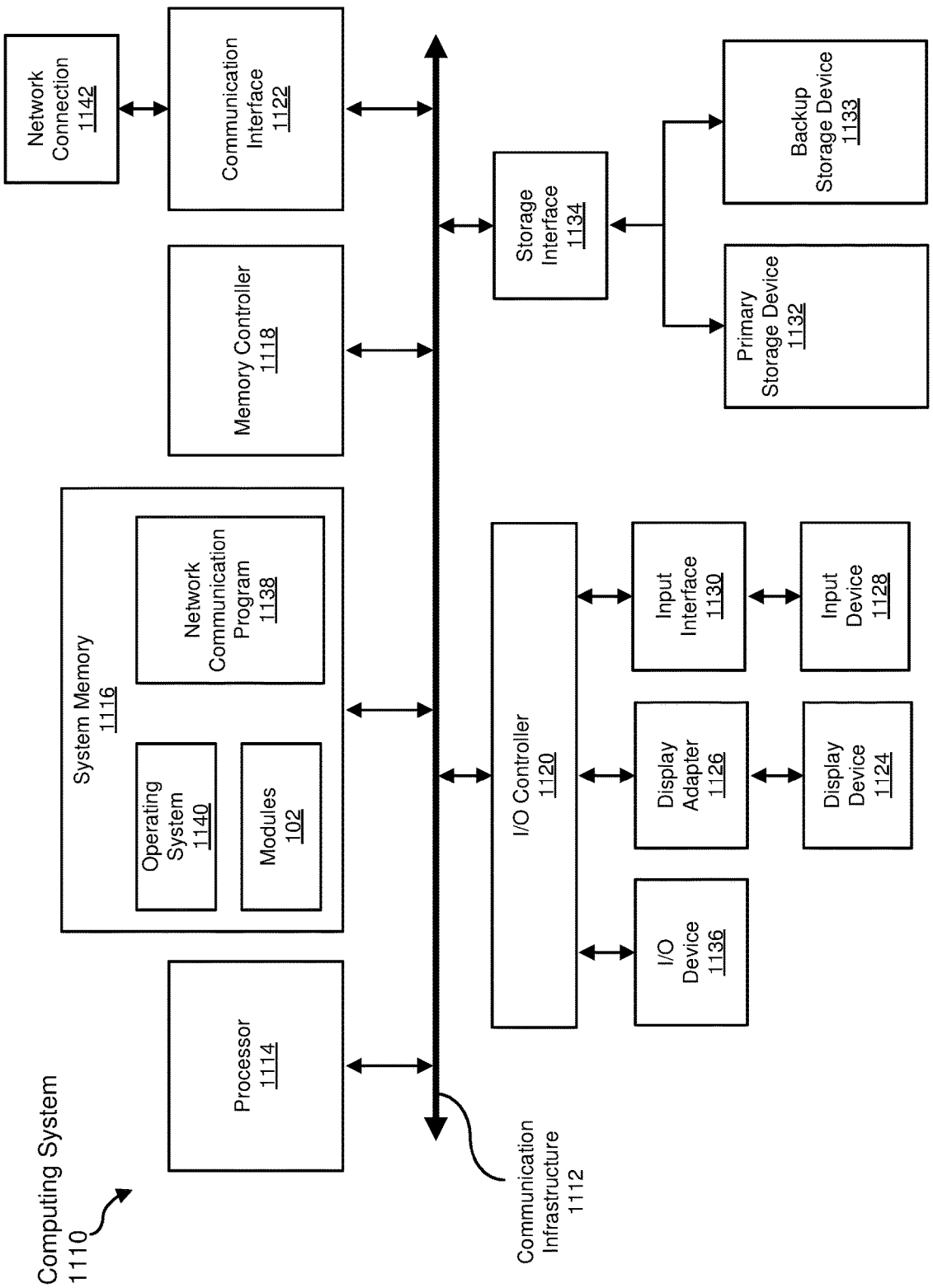
FIG. 11 is a block diagram of an example computing system capable of implementing one or more of the embodiments described and/or illustrated herein.

FIG. 11 is a block diagram of an example computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the example embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110. Examples of operating system 1140 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, example computing system 1110 may also include at least one input device 1128 coupled to I/O controller 1120 via an input interface 1130. Input device 1128 generally represents any type or form of input device capable of providing input, either computer or human generated, to example computing system 1110. Examples of input device 1128 include, without limitation, a keyboard, a pointing device, a speech recognition device, variations or combinations of one or more of the same, and/or any other input device.

Additionally or alternatively, example computing system 1110 may include additional I/O devices. For example, example computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between example computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or Application Specific Integrated Circuit (ASIC) incorporated in communication interface 1122.

As illustrated in FIG. 11, example computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1110 may be configured as an Application Specific Integrated Circuit (ASIC) adapted to implement one or more of the example embodiments disclosed herein.

Figure 12:
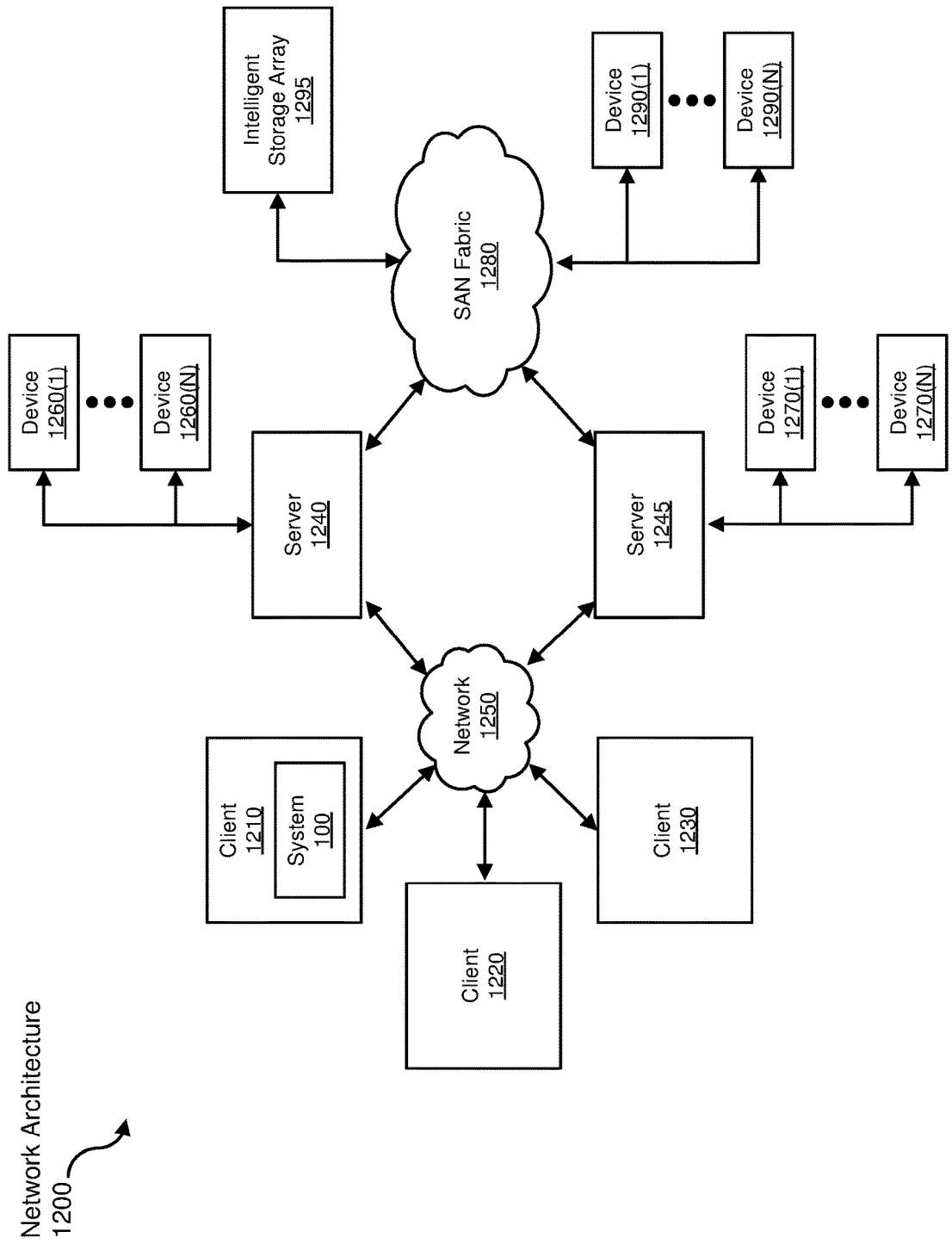
FIG. 12 is a block diagram of an example computing network capable of implementing one or more of the embodiments described and/or illustrated herein.

FIG. 12 is a block diagram of an example network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the present disclosure.

Client systems 1210, 1220, and 1230 generally represent any type or form of computing device or system, such as example computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to example computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an example method for protecting user privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting user privacy, at least a portion of the method being performed by a computing device comprising at least one processor, the method comprising:

receiving, by the computing device, an indication to protect an original photo with privacy-protecting blurring;

generating, by the computing device, a blurred version of the original photo;

generating, by the computing device and based on the blurred version of the original photo, a video that progressively de-blurs the blurred version of the original photo to display the original photo;

linking through metadata, by the computing device, the blurred version of the original photo and the video that progressively de-blurs the blurred version of the original photo to display the original photo as a combined motion-photo-object, wherein the combined motion-photo-object is formatted in a dynamic motion image file format; and storing locally, by the computing device, the combined motion-photo-object in a configured location of a photo display program, wherein the configured location and contents thereof are unsecured save for a device locking mechanism of the computing device, and the combined motion-photo-object is indistinguishable, to a dynamic animation stage of the photo display program, from a dynamic motion image file such that the photo display program uses the blurred version of the original photo as a preview of the combined motion-photo-object when browsing but plays the video that progressively de-blurs the blurred version of the original photo to display the original photo in response to additional user input selecting the preview in a same manner as that which triggers the photo display program to play dynamic motion image files, thereby avoiding entering and completing a password procedure to play the video.

2. The computer-implemented method of claim 1, wherein the combined motion-photo-object comprises a combination file that stores the original photo and the video together as two separate files included within the combination file.

3. The computer-implemented method of claim 1, wherein the combined motion-photo-object embeds the original photo within extra space in a video file storing the video or embeds the video within extra space in a photo file storing the original photo.

4. The computer-implemented method of claim 1, wherein the combined motion-photo-object is formatted in an operating system or smartphone manufacturer format.

5. The computer-implemented method of claim 4, wherein the operating system or smartphone manufacturer format comprises APPLE LIVE PHOTOS, SAMSUNG MOTION PHOTOS, GOOGLE MOTION PHOTOS, or MICROSOFT LIVING IMAGES.

6. The computer-implemented method of claim 1, wherein the combined motion-photo-object repurposes a file format that was designed to add contextual motion animation to single photo frames for a different purpose of protecting user privacy.

7. The computer-implemented method of claim 1, wherein the combined motion-photo-object supplements the original photo with a set of blurred versions of the original photo that were generated by software after capturing the original photo rather than only supplementing the original photo with additional photos captured before or after capturing the original photo.

8. The computer-implemented method of claim 1, wherein the video comprises just two frames that include the original photo and the blurred version of the original photo.

9. The computer-implemented method of claim 1, wherein the original photo comprises sensitive content that benefits from privacy protection through blurring.

10. The computer-implemented method of claim 1, wherein receiving the indication to protect the original photo with privacy-protecting blurring comprises receiving an indication that a user toggled a graphical user interface button to blur the original photo by creating the combined motion-photo-object.

11. The computer-implemented method of claim 1, wherein generating the video that progressively de-blurs the original photo comprises receiving a selection of a graphical user interface button of a level of blurring to be applied to the original photo.

12. The computer-implemented method of claim 1, further comprising displaying a circular or rotating icon that indicates software processing while generating the video.

13. The computer-implemented method of claim 12, further comprising displaying, in response to completing the combined motion-photo-object, a prompt indicating that the combined motion-photo-object was added to a photo library.

14. The computer-implemented method of claim 12, wherein the combined motion-photo-object is stored outside of an encrypted vault due to the blurring of the original photo protecting user privacy rather than an encryption scheme of the encrypted vault.

15. A system for protecting user privacy, the system comprising:

a reception module, stored in memory, that receives an indication to protect an original photo with privacy-protecting blurring; and a generation module, stored in memory of a computing device, that:

generates a blurred version of the original photo;

generates, based on the blurred version of the original photo, a video that progressively de-blurs the blurred version of the original photo to display the original photo;

a linking module, stored in memory of the computing device, that links through metadata the blurred version of the original photo and the video that progressively de-blurs the blurred version of the original photo to display the original photo as a combined motion-photo-object;

a storing module, stored in memory of the computing device, that locally stores the combined motion-photo-object in a configured location of a photo display program, wherein the configured location and contents thereof are unsecured save for a device locking mechanism of the computing device, and the combined motion-photo-object is indistinguishable, to a dynamic animation stage of the photo display program, from a dynamic motion image file such that the photo display program uses the blurred version of the original photo as a preview of the combined motion-photo-object when browsing but plays the video that progressively de-blurs the blurred version of the original photo to display the original photo in response to additional user input selecting the preview in a same manner as that which triggers the photo display program to play dynamic motion image files, thereby avoiding entering and completing a password procedure to play the video; and at least one physical processor configured to execute the reception module, the generation module, the linking module, and the storing module.

16. The system of claim 15, wherein the combined motion-photo-object comprises a combination file that stores the original photo and the video together as two separate files included within the combination file.

17. The system of claim 15, wherein the combined motion-photo-object embeds the original photo within extra space in a video file storing the video or embeds the video within extra space in a photo file storing the original photo.

18. The system of claim 15, wherein the combined motion-photo-object is formatted in an operating system or smartphone manufacturer format.

19. The system of claim 18, wherein the operating system or smartphone manufacturer format comprises APPLE LIVE PHOTOS, SAMSUNG MOTION PHOTOS, GOOGLE MOTION PHOTOS, or MICROSOFT LIVING IMAGES.

20. A non-transitory computer-readable medium comprising one or more computer-readable instructions that, when executed by at least one processor of a computing device, cause the computing device to:
  receive an indication to protect an original photo with privacy-protecting blurring;
  generate a blurred version of the original photo;
  generate, based on the blurred version of the original photo, a video that progressively de-blurs the blurred version of the original photo to display the original photo;
  link through metadata the blurred version of the original photo and the video that progressively de-blurs the blurred version of the original photo to display the original photo as a combined motion-photo-object; and
  locally store the combined motion-photo-object in a configured location of a photo display program, wherein the configured location and contents thereof are unsecured save for a device locking mechanism of the computing device, and the combined motion-photo-object is indistinguishable, to a dynamic animation stage of the photo display program, from a dynamic motion image file such that the photo display program uses the blurred version of the original photo as a preview of the combined motion-photo-object when browsing but plays the video that progressively de-blurs the blurred version of the original photo to display the original photo in response to additional user input selecting the preview in a same manner as that which triggers the photo display program to play dynamic motion image files, thereby avoiding entering and completing a password procedure to play the video.

* * * * *